Jan. 25, 1927.　　　　　　　　　　　　　　　　　1,615,471
T. MIDGLEY
METHOD OF MAKING TIRE MOLDS
Filed March 5, 1925　　　　2 Sheets-Sheet 1
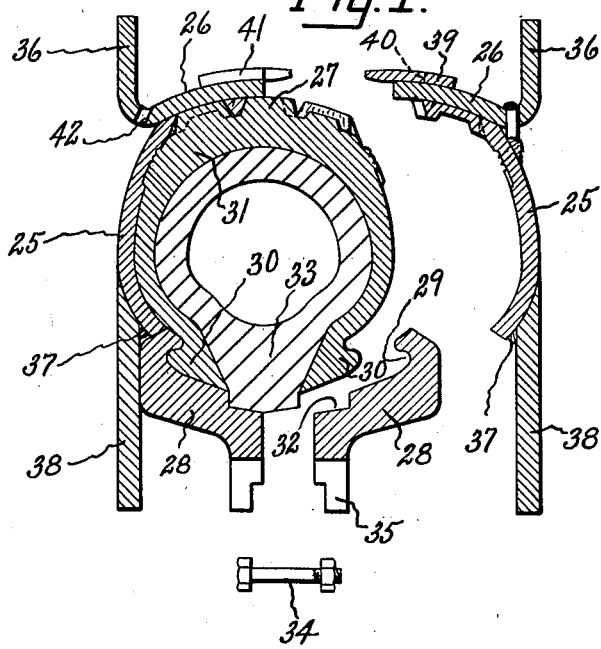
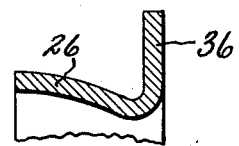
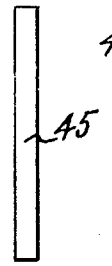
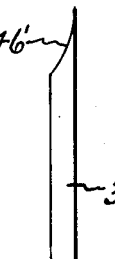
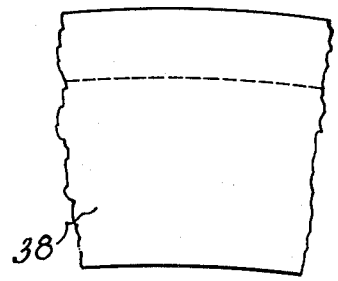
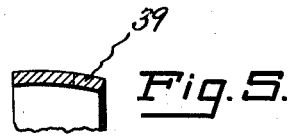
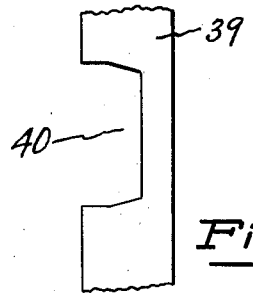
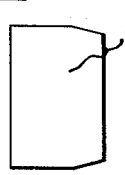
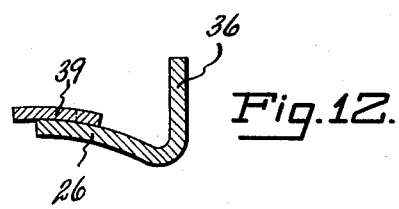
INVENTOR.
Thomas Midgley
BY
Edward C. Taylor
ATTORNEY.

Jan. 25, 1927.
T. MIDGLEY
1,615,471
METHOD OF MAKING TIRE MOLDS
Filed March 5, 1925    2 Sheets-Sheet 2
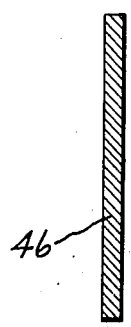
Fig.13.
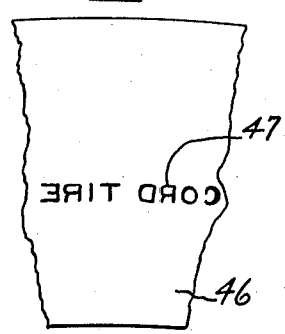
Fig.14.
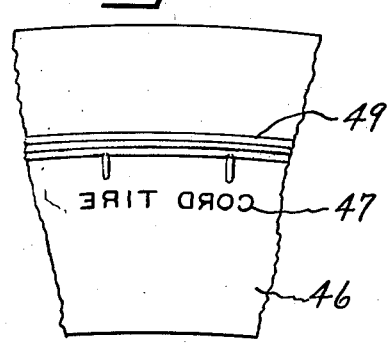
Fig.15.
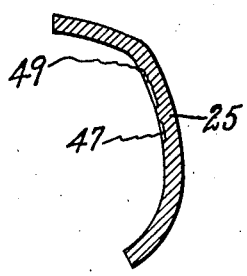
Fig.16.
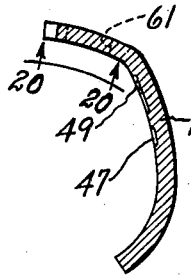
Fig.17.
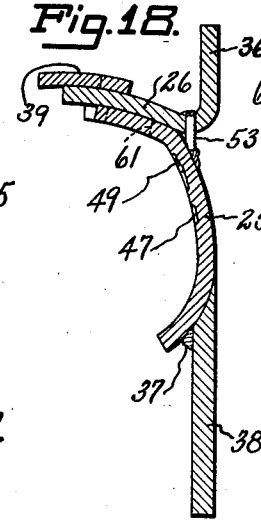
Fig.18.
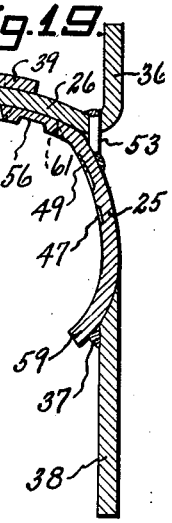
Fig.19.
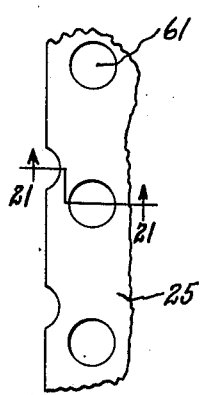
Fig.20.
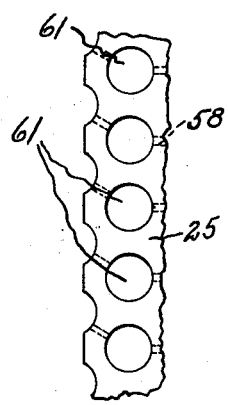
Fig.22.
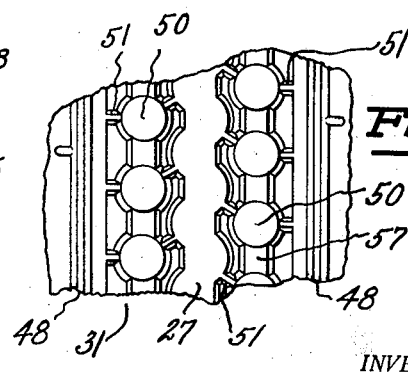
Fig.24.
Fig.21.   Fig.23.
INVENTOR.
Thomas Midgley
Edward C. Taylor
BY
ATTORNEY.

Patented Jan. 25, 1927.

1,615,471

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

METHOD OF MAKING TIRE MOLDS.

Application filed March 5, 1925. Serial No. 13,099.

This invention relates to the manufacture from sheet metal of molds for automobile tires and the like, and is a continuation in part of my earlier application Serial No. 659,813, filed August 28, 1923. The main objects of the present invention are the economical production of molds from sheet metal, the elimination of expensive machine operations, and the provision of a method by which molds of the type shown in my applications Serial Nos. 703,578, 703,580, and 13,098, as well as other types, may be made.

Referring to the drawings,

Fig. 1 is a section through one side of a mold such as is described in my applications Serial Nos. 703,580 and 13,098, one side of the mold being shown as separated from the tire;

Fig. 2 is a section through a blank ring used for one of the parts of the mold;

Fig. 3 is a view of the same after bending;

Fig. 4 is a section through a blank ring used for another part;

Fig. 5 is a view of the same after bending;

Fig. 6 is a plan view thereof showing one method of doweling;

Fig. 7 is a section through an annular plate used for one of the supporting members for the mold;

Fig. 8 is a similar view showing a machining operation;

Fig. 9 is a fragmentary side elevation thereof;

Fig. 10 is a plan of a dowel;

Fig. 11 is a side elevation thereof;

Fig. 12 is a section illustrating the assembly of the rings shown in Figs. 3 and 5;

Fig. 13 is a section of an annular plate used as a blank for one of the side plates of the mold;

Fig. 14 is a fragmentary side elevation thereof showing a lettering operation;

Fig. 15 is a similar view showing a stamping method of impressing a portion of the design upon the plate;

Fig. 16 is a section of the plate after bending;

Fig. 17 is a similar section showing a punching or machining operation;

Fig. 18 is a similar section showing the assembly of the parts shown in Figs. 8, 12, and 17;

Fig. 19 is a similar section showing the result of further operations;

Fig. 20 is a view on line 20—20 of Fig. 17;

Fig. 21 is a section on line 21—21 of Fig. 20;

Fig. 22 is a view similar to Fig. 20 but showing the result of further operations;

Fig. 23 is a section similar to Fig. 21 but showing a beveling operation; and

Fig. 24 is a fragmentary plan of a portion of a tire on which appears the tread design which the particular mold illustrated is intended to produce.

The method has been illustrated in its application to the manufacture of a mold such as is shown in Fig. 1, and claimed as an article in its various aspects in my applications Serial Nos. 703,580 and 13,098. It will be applicable, however, to other types of molds, different features of the method becoming more or less prominent according to the mold being made. Dealing first with the mold shown in the drawings, the particular feature of most present interest is the use of side plates 25 having perforations therein which are closed by cover plates 26 to form molding recesses for portions of the tread pattern on the tire.

In the mold shown in Fig. 1 the side plates 25 are curved to the general outline of the tire but do not quite meet at the center of the tread. The space thus left is closed by the cover plate 26, a peripheral molding recess being thus formed which molds the central rib 27 (Fig. 24) of the tire tread. At their inner edges the side plates are beveled to fit corresponding bearing surfaces on bead rings 28, which are provided with molding grooves 29 to fit the beads 30 of the tire 31. Shoulders 32 on the two bead rings unite to form a circumferential recess to receive the base of a fluid pressure bag 33, which is arranged to project below the beads of the tire. The bead rings may be held together by bolts 34 fitting in slots 35 in the rings. The cover plates 26, which are attached to the side plates by brazing, sweating, welding, or by a combination of these, are bent outwardly to form flanges 36 upon which the mold may rest when a series of molds are piled in a stack. In line with these flanges, welded at 37 to the side plates, and bearing upon the sides of the bead rings, are supporting plates 38 which assist flanges 36 in the reception and distribution of lateral pressure. Suitable doweling means may be provided to insure alignment and registration of the two mold halves, such as a ring 39 secured to one cover plate and provided at suitable intervals with notches 40 (Fig. 6) into which fit small tapered pieces 41 (Figs. 1 and 10) secured to the other cover plate. Suitable holes 42 may be provided for the drainage of condensed steam or cooling water wherever it is found that pocketing of water occurs.

The method of making this mold may now be considered, it being understood that the features of invention, as more particularly pointed out in the appended claims, are capable of employment with molds of other specific types. The making of the cover plate 26 has been shown in Figs. 2 and 3. As shown, this plate is formed from a ring 43 of a diameter about equal to the smallest diameter of the finished plate, the shaping of the plate being accomplished in dies in a manner familiar in the art of sheet metal working. If desired, this plate might be shaped from a flat annular piece of metal, but on account of the wastage in cutting annuli from flat sheets the use of a ring bent up from a strip and welded is preferred. Dowel ring 39 is similarly formed from a ring 44 (Figs. 4, 5, and 6). Plates 38 are formed from annular blanks 45, the blank being machined at 46′ to fit the curve of the side plate 25. Dowels 41 (Figs. 10 and 11) can be formed by a simple punching and bending operation. The cover plate 26 and ring 41 are joined together in the manner indicated in Fig. 12 to form an assembly ready for uniting to the side plates. The joining of these two members may be by welding, or by a brazing or sweating operation.

Side plates 25 are formed from annular blanks 46 (Figs. 13, 14, and 15). The lettering which is to mold the desired trademark, dimensions, etc., upon the side wall of the tire, instead of being formed in the mold by engraving after the mold is all shaped, an expensive and slow operation, is formed by a stamping operation while the ring is in the flat form. This permits the use of simpler stamps and easier operations than if the plate were curved first, and the use of stamps rather than an engraving machine permits a single letter or section of the design to be struck up instantly instead of being produced by a slow cutting. The stamping of the lettering in the flat blank is shown at 47 (Fig. 14), the lettering appearing, of course, in reverse.

There is frequently a beading 48 (Fig. 24) or other similar finish upon the portion of the tire where the tread joins the side wall. This pattern can also be formed in the mold while the side plates are still in flat blank form, with greater ease, cheapness and rapidity. This is preferably accomplished by a stamping operation, either by an annular die or by repeated impresses of a die covering a segment of the pattern. It will be found that the pattern or lettering thus formed upon the side walls suffers no appreciable distortion when the blank is curved into tire form. The flat blank with the design indented thereon at 49 is shown in Fig. 15.

It is preferable to make the perforations 61 in the tread portion of the cover plate after bending, for the strains set up by the bending of the blank nearly at right angles to its initial form are likely to cause distortion. These perforations are for the purpose, as will be remembered, of forming molding recesses for producing a tread pattern, the perforations being closed on one side by the cover plate when the mold is formed. With certain tread patterns, particularly such as do not have the raised portions 50 of the tread (which correspond with the perforations in the mold) joined by connecting fins 51, it is possible to do all the stamping in the flat, as the greater strength of the metal in such cases prevents as great distortion. Even in such cases, however, there may be some slight change in shape of the perforations during the bending operation, and to counteract this the shape of the perforations made in the flat blank may be so designed as to compensate for this change, forming the desired shape after the bending is done. The bending may be done in metal bending dies in a manner easily understood, and may be done with the metal hot or cold, depending on its thickness and the difficulty of forming into the particular shape desired. The bent blank, before perforating, is shown in Fig. 16.

The blank may be perforated in any desired manner, but I have found it desirable, in cases where the holes are rather closely spaced, to punch alternate holes first, forming the rest at a subsequent operation. This avoids distortion of the material in punching, since if adjacent holes were punched successively there would be less resistance on the side of a hole adjacent the already punched holes than there would be on the side adjacent the unpunched stock, resulting in a flowing of material towards the first side with a consequent distortion of previously punched holes. If the holes are drilled this distortion will not occur and the precaution mentioned need not be taken. The holes may be reamed out on a bevel as shown in Fig. 23 to give a tapered form to the buttons of the tread pattern.

The bent and perforated side plate is now ready for assembly with the previously made unit illustrated in Fig. 12. As before, the permanent joining of the several pieces is preferably accomplished by a sweating or brazing operation. The supporting plates 38 are conveniently joined on by welding at 37, coupled if desired with brazing on the surfaces of contact. In cases of molds having considerable width, strengthening pins 53 may be inserted through holes in cover plate 26 and welded in place.

To finish the mold the edges 54 and 55 are trimmed as shown in Fig. 19, the latter being beveled in the case shown to give tapered sides to the central rib 27 (Fig. 24) of the tread pattern. Circumferential grooves 56 may be machined in the side plates to form the connecting bars 57 for the rows of buttons 50, and slots or grooves 58 (shown in Fig. 2 in dotted lines to indicate that they are made after the other operations there shown are performed) cut in to make the connecting fins 51 of the pattern. After trimming the edges 59 to fit the mating surfaces of the bead rings, beveling surface 60 of ring 39, and cleaning out any solder, etc., which may have become lodged in the molding recesses, the mold is ready for use. If desired the beveling of holes 61 may be postponed until the mold is assembled, being done concurrently with the cleaning out of the solder.

In describing the construction of the mold illustrated, considerable detail has been devoted to features which might be modified if molds of other types were being used. In the following claims these incidental features will be distinguished from those forming part of the invention.

Having thus described my invention, I claim:

1. The method of making a tire mold which comprises impressing a molding pattern in a flat plate, bending the plate into curved mold shape, perforating the outer circumference of the plate, and covering the perforations with another plate to form molding recesses.

2. The method of making a tire mold which comprises forming a flat annular plate, bending the plate into curved mold shape, perforating the plate at its outer circumference, bending a second plate to conform to the outer portion of the first, and securing the two plates permanently together.

3. The method of making a tire mold which comprises forming a flat annular plate, impressing a molding pattern thereon, bending the plate into curved mold form, perforating the plate at its outer circumference, bending a second plate to conform to the outer surface of the first, and securing the two plates permanently together.

4. A method of forming a tire mold including perforating a plate, covering the perforations with a second plate, securing the two together, and locating the assembly in the tread forming portion of the mold.

THOMAS MIDGLEY.